W. DONAGHY.
TRACTOR LEVELING DEVICE.
APPLICATION FILED MAR. 25, 1918.

1,324,108.

Patented Dec. 9, 1919.
3 SHEETS—SHEET 1.

INVENTOR
William Donaghy

BY
L. L. Westfall
ATTORNEY

W. DONAGHY.
TRACTOR LEVELING DEVICE.
APPLICATION FILED MAR. 25, 1918.

1,324,108.

Patented Dec. 9, 1919.
3 SHEETS—SHEET 2.

INVENTOR
William Donaghy
BY
L. L. Westfall
ATTORNEY

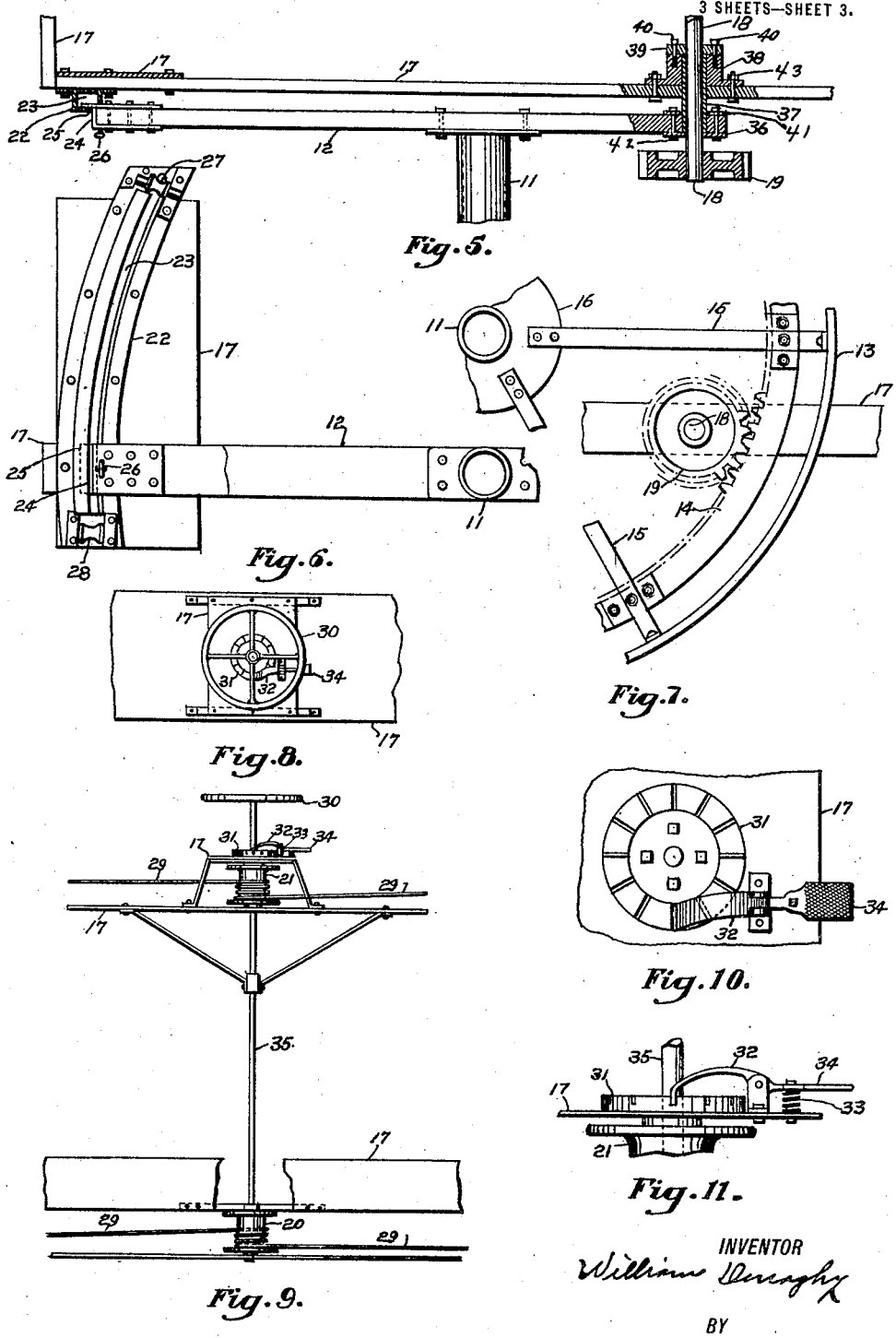

UNITED STATES PATENT OFFICE.

WILLIAM DONAGHY, OF SPOKANE, WASHINGTON.

TRACTOR LEVELING DEVICE.

1,324,108. Specification of Letters Patent. Patented Dec. 9, 1919.

Application filed March 25, 1918. Serial No. 224,491.

*To all whom it may concern:*

Be it known that I, WILLIAM DONAGHY, a citizen of the United States of America, residing at Spokane, in the county of Spokane and State of Washington, have invented new and useful Improvements in Tractor Leveling Devices, of which the following is a specification.

This invention pertains to tractors and has for its object to provide a new and improved means for maintaining the frame in a horizontal position and the wheels in a perpendicular position at all times whether running on level ground, or on sloping or hillside ground. The particular construction will be hereafter particularly described and pointed out in the claims and illustrated in the accompanying drawings in which—

Fig. 5, is an enlarged combined broken-away plan view of the frame and sectional view of the frame, bearing and pinion.

Fig. 6, is an enlarged broken-away side view of one of the frame and adjusting means.

Fig. 7, is an enlarged broken-away side view of one of the tractor wheels, of the frame, and showing a connecting pinion.

Fig. 8, shows a top plan view of a means for rotating a pair of drums used in the construction, the same being attached to a broken away portion of the frame.

Fig. 9, is an enlarged broken-away view of the rear end of the frame showing rotatably mounted drums attached thereto, cables attached thereto, and means for rotating the drums.

Fig. 10, shows a broken-away portion of the frame to which is attached a pawl and horizontally arranged rack in which the pawl operates.

Fig. 11, is a side view of the same.

Figure 1:
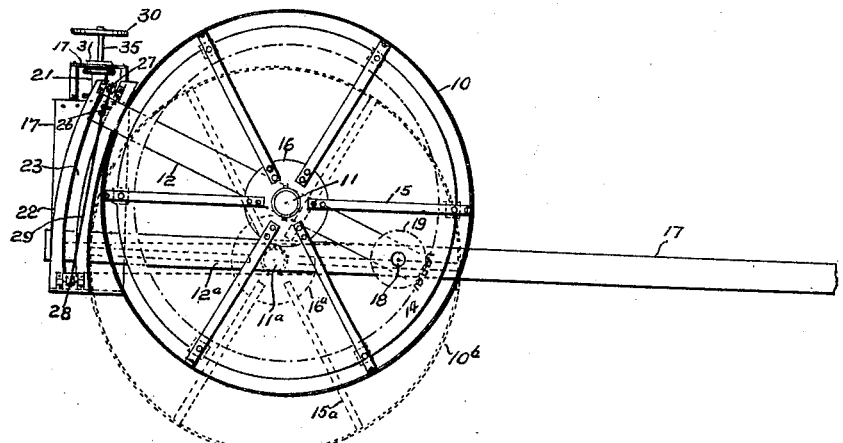
Figure 1, is a side view of a pair of tractor wheels and a broken away portion of a frame, showing the construction whereby the adjustments are effected and maintained. A changed position of the wheel is indicated by dotted lines.
Figure 2:
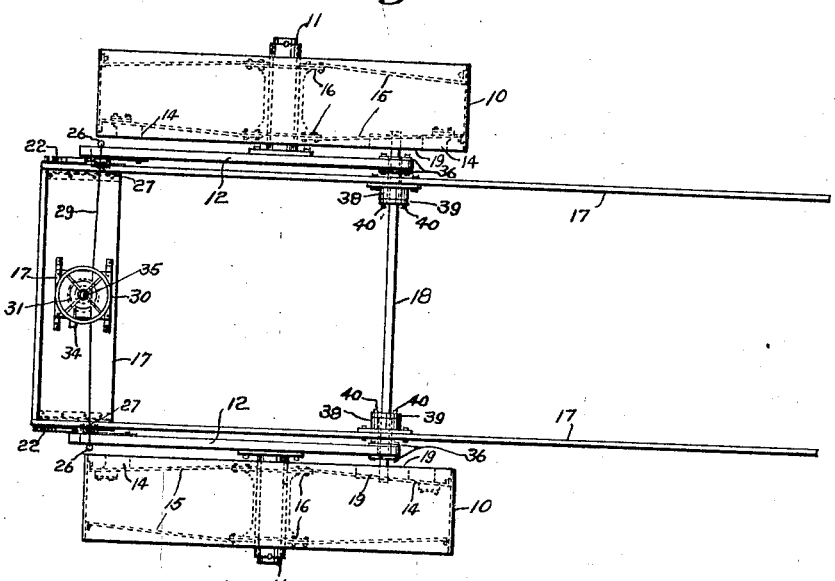
Fig. 2, is a top, plan view of the same.

In a detail description in which like numerals refer to like parts throughout the several views, a pair of bull wheels 10 are rotatably mounted in axles 11 secured to arms 12 (Fig. 2). Mounted inside of the felly 13 of the bull wheels 10 (Fig. 7) is an annular rack 14 supported as by spokes 15 reaching from the hub 16 to the felly 13. Horizontally mounted across the frame 17 is the power shaft 18 carrying at each end a pinion gear 19 in mesh with the rack 14. The power shaft 18 is rotatably mounted in bearings that pass through the frame 17 and through the inner ends of the arms 12. Vertically arranged and secured by the frame 17 at the rear end thereof is a shaft 35, (Figs. 3 and 4) to each the upper and lower ends of which is secured a drum 20 and 21. Secured to each side of the frame 17, at the rear end thereof (Fig. 6) is a sector 22, a curved, longitudinally arranged slot 23, being made therethrough. Plates 24 (Fig. 5) on the outer ends of the arms 12 enter the slots 23 and bear against the guides 25. A knob 26 is secured to the outer end of each of the arms 12. Rotatably mounted rollers 27 and 28 are secured to the upper and lower ends, respectively, of the sectors 22. An endless cable 29 is wound several times about the drum 21, extended over the roller 27 at the top of the sector 22 on one side of the frame 17, then secured to the knob 26 on the end of the arm 12 on that side of the frame, extended over the roller 28 at the bottom of the sector 22 on that side of the frame 17 and extended to and connected at the drum 21. Mounted horizontally on the top of the shaft 35 (Figs. 8 and 9) is a wheel 30. Mounted also horizontally on the shaft 35 is an annular rack 31. Mounted on the frame 17 adjacent to the rack 31 is a pawl 32, adapted for engagement with the rack 31. A coil spring 33 inserted between the frame 17 and the pawl extension 34 serves to hold the pawl in engagement with the rack. A sleeve 37 extends through the arm 12 and the frame 17, integral with which is a plate 36 which bears against the outside of the arm 12. A plate 41 bears against the inner side of the arm 12 and the two plates are locked together by means of rivets or bolts 42. A cap 39 is placed over the sleeve 37 on the inside of the frame 17 and the same is secured to the frame 17 by means of the bolts 43. A plate 39 is placed over the shaft 18 and secured to the cap 38 by means of screws 40. Thus the frame 17 and arms are held in permanent relative position.

Figure 3:
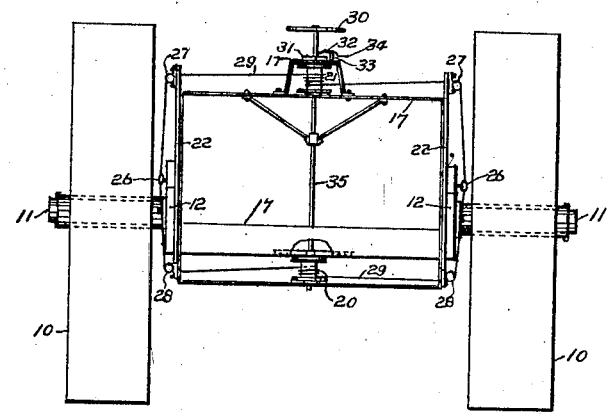
Fig. 3, is a rear view of the same, showing both the frame and the wheels in a horizontal position.
Figure 4:
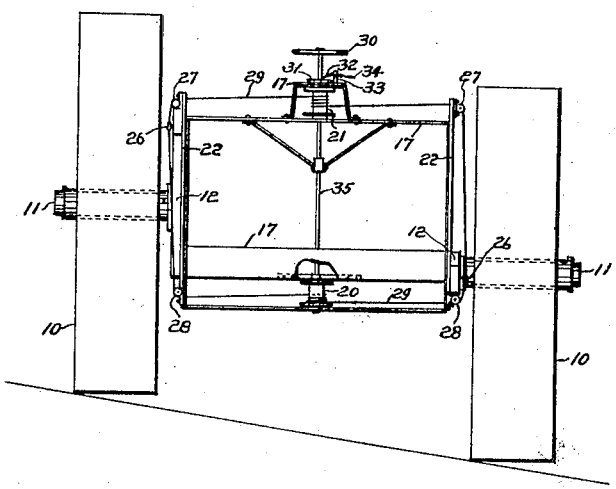
Fig. 4, is a rear view of the same showing the frame in a horizontal position, the wheels in a vertical position but not in a horizontal position with relation to each other, one being lower than the other and adapted to a sloping surface.

In the practical operation of the device, we will assume that the tractor is being operated on level ground and that the relative positions of the wheels are as shown in Fig. 3, horizontal with each other. When we desire to operate the tractor on a side hill and still maintain the frame in a horizontal position it beceomes necessary to change the relative positions of the wheels to correspond with the positions shown in Fig. 4. The pawl 32 will be manually released with the hand or foot pressure on the upper surface of the extension 34 and the wheel 30 manually turned to the right which rotates the drums 20 and 21 to feed the cable 29 downwardly on the right side of the tractor and upwardly on the left side thereof. This has the effect of lowering the arm 12 on the right side of the tractor and elevating the same on the left side thereof. The wheels 10 being attached to the arms 12 between the connection of the arms 12 with the frame 17 and the connection with the cable 29 causes the wheels to fall or rise with the falling or rising of the arms, consequently the right wheel of the tractor will be lowered and the left wheel will be elevated. After the wheels have been adjusted to secure the desired leveling of the frame 17, the pawl 32 is again thrown into engagement with the rack 31 by the release of the same, the coil spring 33 serving to effect the safe engagement desired. The power to drive the tractor is applied to the shaft 18, conveyed from the shaft 18 to the pinion wheels 19 and from the pinion wheels 19 to the tractor wheels 10 by means of the rack 14.

What is claimed is:

1. In a tractor, means for maintaining the frame in a horizontal position and the wheels in a perpendicular position, which comprises an arm rotatably attached to the frame on each side thereof, a wheel of the tractor attached to each arm intermediate the ends thereof, a guide for the free end of the arms, a pair of drums mounted on a rotatable shaft between said arms, a cable attached to each of said arms and passed around each of said drums, an annular rack mounted in each of the tractor wheels, a power shaft rotatably mounted across the tractor frame, and a pinion wheel at each end of said shaft meshing with the racks in the tractor wheels.

2. In a tractor, means for maintaining the frame in a horizontal position and the wheels in a perpendicular position, which comprises an arm rotatably attached to the frame on each side thereof, a wheel of the tractor attached to each arm intermediate the ends thereof, a guide for the free end of the arms, a pair of drums mounted on a rotatable shaft between said arms, a cable attached to each of said arms and passed around each of said drums, an annular rack mounted in each of the tractor wheels, a power shaft rotatably mounted across the tractor frame, a pinion wheel at each end of said shaft meshing with the racks in the tractor wheels, and means for manually rotating said drums and for locking the same against voluntary rotation.

In testimony whereof I affix my signature in presence of two witnesses.

WILLIAM DONAGHY.

Witnesses:
 J. E. McAndrew,
 L. L. Westfall.